United States Patent
Goodchild et al.

(10) Patent No.: US 12,500,448 B2
(45) Date of Patent: Dec. 16, 2025

(54) MULTI-COIL SELECTION IN A CHARGING DEVICE

(71) Applicant: AIRA, INC., Chandler, AZ (US)

(72) Inventors: Eric Heindel Goodchild, Phoenix, AZ (US); John Winters, Chandler, AZ (US); Jake Slatnick, San Diego, CA (US)

(73) Assignee: AIRA, INC., Chandler, AZ (US)

( * ) Notice: Subject to any disclaimer, the term of this patent is extended or adjusted under 35 U.S.C. 154(b) by 773 days.

(21) Appl. No.: 17/790,896

(22) PCT Filed: Jan. 4, 2021

(86) PCT No.: PCT/US2021/012102
§ 371 (c)(1),
(2) Date: Jul. 5, 2022

(87) PCT Pub. No.: WO2021/141863
PCT Pub. Date: Jul. 15, 2021

(65) Prior Publication Data
US 2023/0045983 A1 Feb. 16, 2023

Related U.S. Application Data

(60) Provisional application No. 62/957,427, filed on Jan. 6, 2020.

(51) Int. Cl.
*H02J 7/00* (2006.01)
*H01F 38/14* (2006.01)
(Continued)

(52) U.S. Cl.
CPC ............ *H02J 50/005* (2020.01); *H01F 38/14* (2013.01); *H02J 50/10* (2016.02)

(58) Field of Classification Search
None
See application file for complete search history.

(56) References Cited

U.S. PATENT DOCUMENTS

| 2014/0312833 A1* | 10/2014 | Won | H02J 50/90 320/108 |
| 2016/0134154 A1 | 5/2016 | Baarman et al. | |

(Continued)

FOREIGN PATENT DOCUMENTS

| JP | 2014176125 A | 9/2014 |
| JP | 2015053751 A | 3/2015 |

(Continued)

OTHER PUBLICATIONS

Office Action for Japanese Patent Application No. 2022-541828, dated Nov. 12, 2024, 7 pages.

(Continued)

*Primary Examiner* — Arun C Williams
(74) *Attorney, Agent, or Firm* — LOZA & LOZA, LLP; Anthony Smyth

(57) ABSTRACT

Systems, methods and apparatus for wireless charging are disclosed. A method for operating a wireless charging device includes determining that a chargeable device is positioned proximate to a plurality of charging coils provided at a charging surface of the wireless charging device, identifying two or more charging configurations for the chargeable device, determining power loss while wirelessly transmitting power to the chargeable device for each charging configuration in the two or more charging configurations, and initiating charging of the chargeable device using a charging configuration associated with a lowest power loss to configure the wireless charging device. Each charge configuration includes at least one of the plurality of charging coils.

18 Claims, 13 Drawing Sheets

(51) Int. Cl.
    *H02J 50/00*     (2016.01)
    *H02J 50/10*     (2016.01)

(56) References Cited

U.S. PATENT DOCUMENTS

| | | |
|---|---|---|
| 2016/0276878 A1 | 9/2016 | Azancot et al. |
| 2017/0250563 A1 | 8/2017 | Davison et al. |

FOREIGN PATENT DOCUMENTS

| | | |
|---|---|---|
| JP | 2017528106 A | 9/2017 |
| KR | 20170041891 A | 4/2017 |
| WO | 2016041880 A1 | 3/2016 |

OTHER PUBLICATIONS

Office Action for Korean Patent Application No. 10-2022-7027265, dated Jan. 17, 2025, 5 pages.
PCT/US2021/012102. International Search Report & Written Opinion (Apr. 14, 2021).

\* cited by examiner

MULTI-COIL SELECTION IN A CHARGING DEVICE

PRIORITY CLAIM

This application is the U.S. National Stage of International Patent Application No. PCT/US2021/012102 filed on Jan. 4, 2021, which claims priority to and the benefit of provisional patent application No. 62/957,427 filed in the United States Patent Office on Jan. 6, 2020, the entire content of these applications being incorporated herein by reference as if fully set forth below in their entirety and for all applicable purposes.

TECHNICAL FIELD

The present invention relates generally to wireless charging of batteries, including the use of a multi-coil wireless charging device to charge batteries in mobile devices regardless of location of the mobile devices on a surface of the multi-coil wireless charging device.

BACKGROUND

Wireless charging systems have been deployed to enable certain types of devices to charge internal batteries without the use of a physical charging connection. Devices that can take advantage of wireless charging include mobile processing and/or communication devices. Standards, such as the Qi standard defined by the Wireless Power Consortium enable devices manufactured by a first supplier to be wirelessly charged using a charger manufactured by a second supplier. Standards for wireless charging are optimized for relatively simple configurations of devices and tend to provide basic charging capabilities.

Improvements in wireless charging capabilities are required to support continually increasing complexity of mobile devices and changing form factors. For example, there is a need for improved charging techniques for multi-coil, multi-device charging pads.

DETAILED DESCRIPTION

Figure 1:
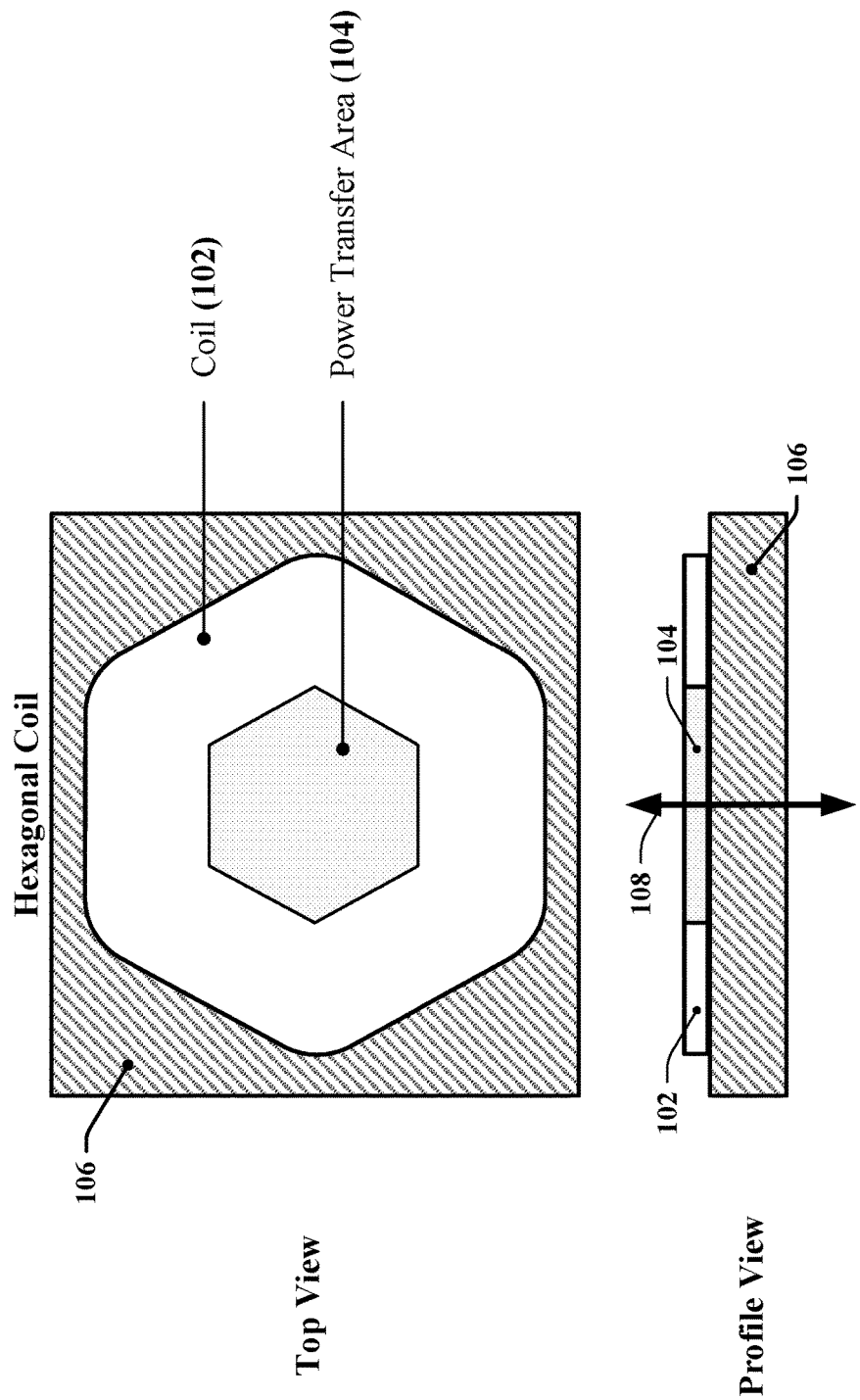
FIG. 1 illustrates an example of a charging cell that may be employed to provide a charging surface in a wireless charging device in accordance with certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of wireless charging systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium. A processor-readable storage medium, which may also be referred to herein as a computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), Near Field Communications (NFC) token, random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Overview

Certain aspects of the present disclosure relate to systems, apparatus and methods applicable to wireless charging devices that provide a free-positioning charging surface that has multiple transmitting coils or that can concurrently charge multiple receiving devices. In one aspect, a controller in the wireless charging device can locate a device to be charged and can configure one or more transmitting coils optimally positioned to deliver power to the receiving device. Charging cells may be provisioned or configured with one or more inductive transmitting coils and multiple charging cells may be arranged or configured to provide the charging surface. The location of a device to be charged may be detected through sensing techniques that associate location of the device to changes in a physical characteristic centered at a known location on the charging surface. In some examples, sensing of location may be implemented using capacitive, resistive, inductive, touch, pressure, load, strain, and/or another appropriate type of sensing.

Certain aspects disclosed herein relate to improved wireless charging techniques. Systems, apparatus and methods are disclosed that accommodate free placement of chargeable devices on a surface of a multi-coil wireless charging device. Certain aspects can improve the efficiency and capacity of wireless power transmission to a receiving device. In one example, a wireless charging apparatus has a battery charging power source, a plurality of charging cells configured in a matrix, a first plurality of switches in which each switch is configured to couple a row of coils in the matrix to a first terminal of the battery charging power source, and a second plurality of switches in which each switch is configured to couple a column of coils in the matrix to a second terminal of the battery charging power source. Each charging cell in the plurality of charging cells may include one or more coils surrounding a power transfer area. The plurality of charging cells may be arranged adjacent to a charging surface without overlap of power transfer areas of the charging cells in the plurality of charging cells.

According to certain aspects disclosed herein, power can be wirelessly transferred to a receiving device located anywhere on a charging surface that can have an arbitrarily defined size or shape without regard to any discrete placement locations enabled for charging. Multiple devices can be simultaneously charged on a single charging surface. The charging surface may be manufactured using printed circuit board technology, at low cost and/or with a compact design.

Charging Cells

Certain aspects of the present disclosure relate to systems, apparatus and methods applicable to wireless charging devices that provide a free-positioning charging surface that has multiple transmitting coils or that can concurrently charge multiple receiving devices. In one aspect, a processing circuit coupled to the free-positioning charging surface can be configured to locate a device to be charged and can select and configure one or more transmitting coils that are optimally positioned to deliver power to the receiving device. Charging cells may be configured with one or more inductive transmitting coils and multiple charging cells may be arranged or configured to provide the charging surface. The location of a device to be charged may be detected through sensing techniques that associate location of the device to changes in a physical characteristic centered at a known location on the charging surface. In some examples, sensing of location may be implemented using capacitive, resistive, inductive, touch, pressure, load, strain, and/or another appropriate type of sensing.

According to certain aspects disclosed herein, a charging surface in a wireless charging device may be provided using charging cells that are deployed adjacent to the charging surface. In one example the charging cells are deployed in accordance with a honeycomb packaging configuration. A charging cell may be implemented using one or more coils that can each induce a magnetic field along an axis that is substantially orthogonal to the charging surface adjacent to the coil. In this disclosure, a charging cell may refer to an element having one or more coils where each coil is configured to produce an electromagnetic field that is additive with respect to the fields produced by other coils in the charging cell and directed along or proximate to a common axis. In this description, a coil in a charging cell may be referred to as a charging coil or a transmitting coil.

In some examples, a charging cell includes coils that are stacked along a common axis. One or more coils may overlap such that they contribute to an induced magnetic field substantially orthogonal to the charging surface. In some examples, a charging cell includes coils that are arranged within a defined portion of the charging surface and that contribute to an induced magnetic field within the defined portion of the charging surface, the magnetic field contributing to a magnetic flux flowing substantially orthogonal to the charging surface. In some implementations, charging cells may be configurable by providing an activating current to coils that are included in a dynamically-defined charging cell. For example, a wireless charging device may include multiple stacks of coils deployed across a charging surface, and the wireless charging device may detect the location of a device to be charged and may select some combination of stacks of coils to provide a charging cell adjacent to the device to be charged. In some instances, a charging cell may include, or be characterized as a single coil. However, it should be appreciated that a charging cell may include multiple stacked coils and/or multiple adjacent coils or stacks of coils.

FIG. 1 illustrates an example of a charging cell 100 that may be deployed and/or configured to provide a charging surface in a wireless charging device. In this example, the charging cell 100 has a substantially hexagonal shape that encloses one or more coils 102 constructed using conductors, wires or circuit board traces that can receive a current sufficient to produce an electromagnetic field in a power transfer area 104. In various implementations, some coils 102 may have a shape that is substantially polygonal, including the hexagonal charging cell 100 illustrated in FIG. 1. Other implementations may include or use coils 102 that have other shapes. The shape of the coils 102 may be determined at least in part by the capabilities or limitations of fabrication technology or to optimize layout of the charging cells on a substrate 106 such as a printed circuit board substrate. Each coil 102 may be implemented using wires, printed circuit board traces and/or other connectors in a spiral configuration. Each charging cell 100 may span two or more layers separated by an insulator or substrate 106 such that coils 102 in different layers are centered around a common axis 108.

Figure 2:
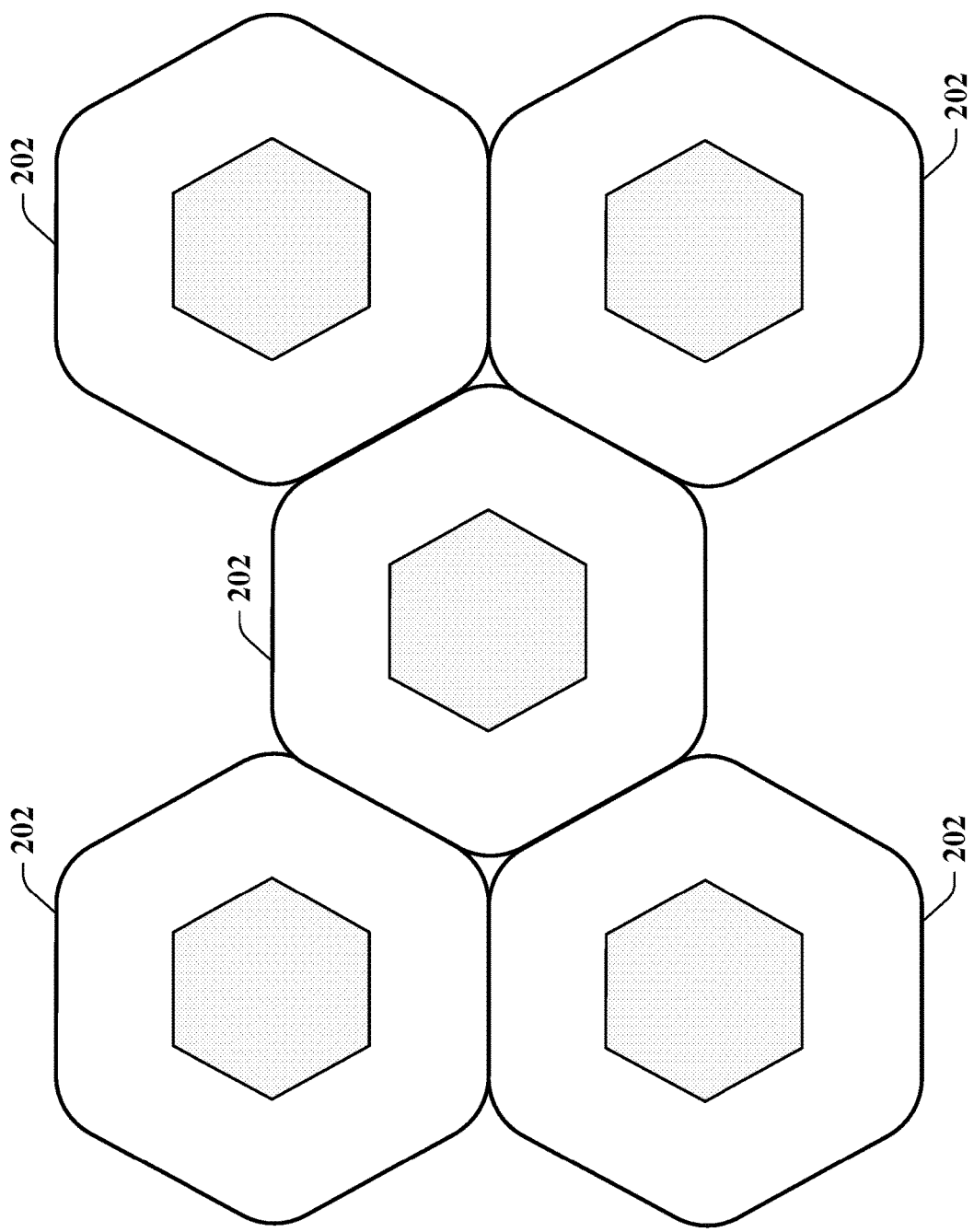
FIG. 2 illustrates an example of an arrangement of charging cells provided on a single layer of a segment of a charging surface that may be adapted in accordance with certain aspects disclosed herein.

FIG. 2 illustrates an example of an arrangement 200 of charging cells 202 provided on a single layer of a segment or portion of a charging surface that may be adapted in accordance with certain aspects disclosed herein. The charging cells 202 are arranged according to a honeycomb packaging configuration. In this example, the charging cells 202 are arranged end-to-end without overlap. This arrangement can be provided without through-holes or wire interconnects. Other arrangements are possible, including arrangements in which some portion of the charging cells 202 overlap. For example, wires of two or more coils may be interleaved to some extent.

Figure 3:
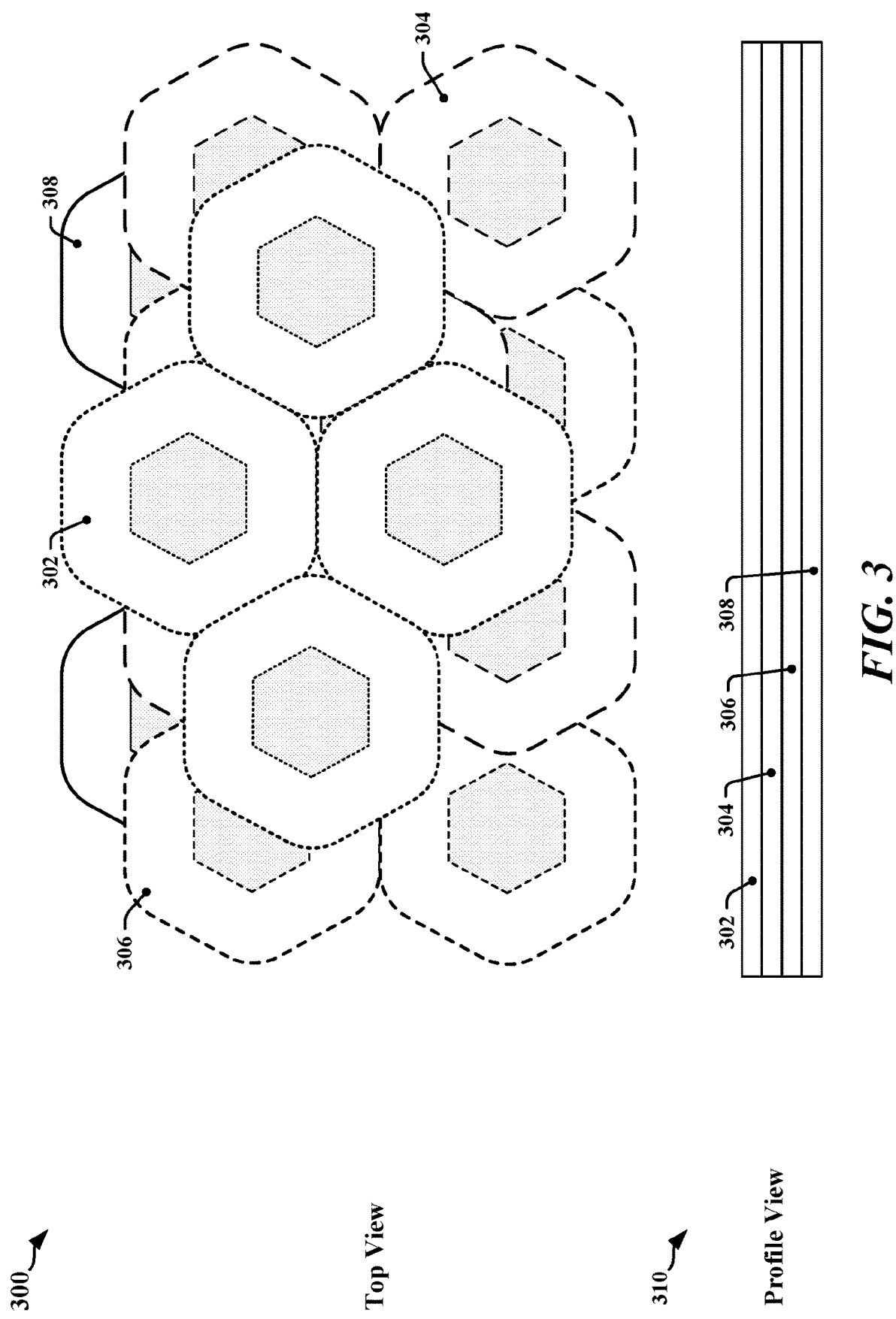
FIG. 3 illustrates an example of an arrangement of charging cells when multiple layers are overlaid within a segment of a charging surface that may be adapted in accordance with certain aspects disclosed herein.

FIG. 3 illustrates an example of an arrangement of charging cells from two perspectives 300, 310 when multiple layers are overlaid within a segment or portion of a charging surface that may be adapted in accordance with certain aspects disclosed herein. Layers of charging cells 302, 304, 306, 308 are provided within the charging surface. The charging cells within each layer of charging cells 302, 304, 306, 308 are arranged according to a honeycomb packaging configuration. In one example, the layers of charging cells 302, 304, 306, 308 may be formed on a printed circuit board that has four or more layers. The arrangement of charging cells 100 can be selected to provide complete coverage of a designated charging area that is adjacent to the illustrated segment.

Figure 4:
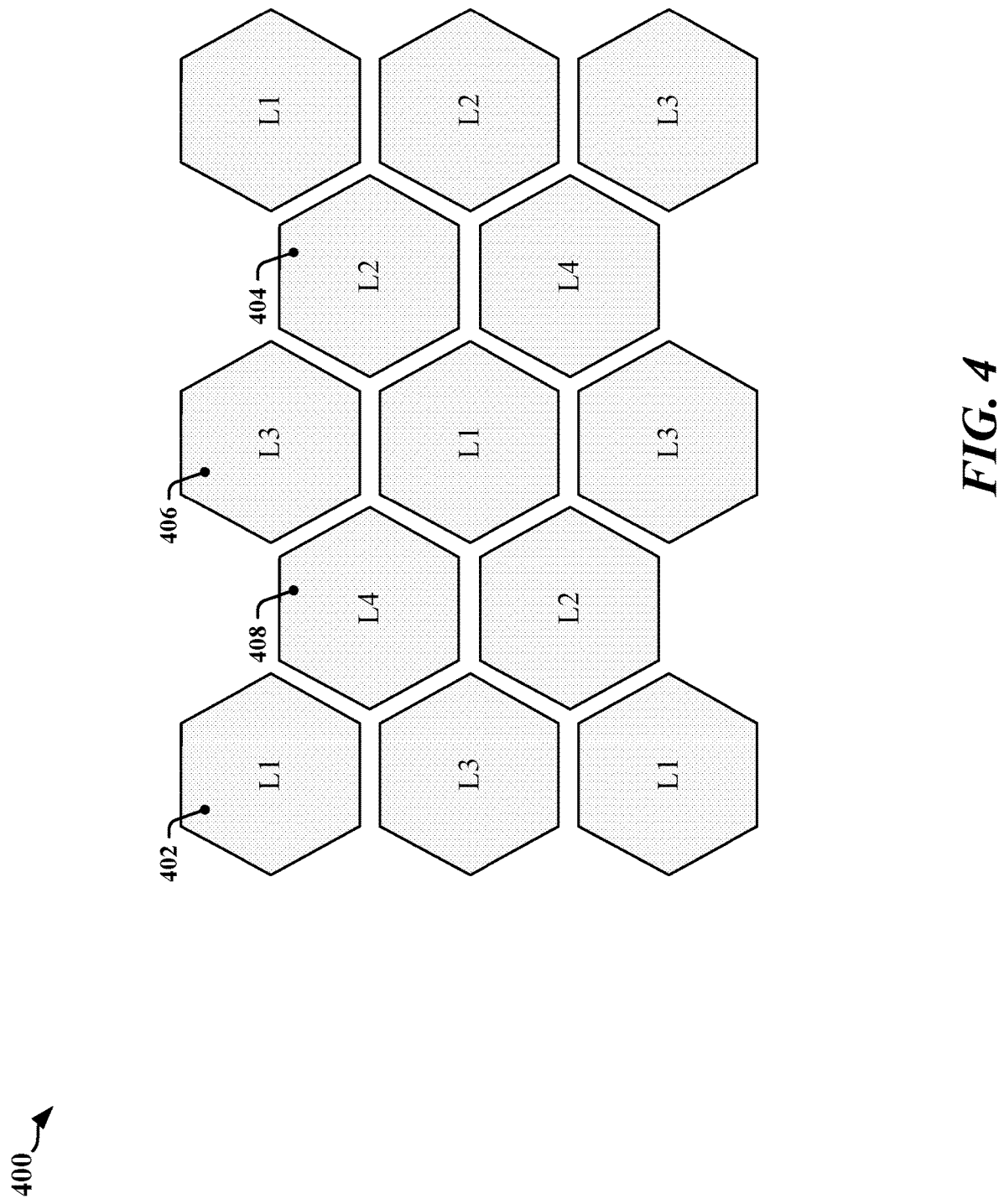
FIG. 4 illustrates the arrangement of power transfer areas provided by a charging surface that includes multiple layers of charging cells configured in accordance with certain aspects disclosed herein.

FIG. 4 illustrates the arrangement of power transfer areas provided in a charging surface 400 that employs multiple layers of charging cells configured in accordance with certain aspects disclosed herein. The illustrated charging surface is constructed from four layers of charging cells 402, 404, 406, 408. In FIG. 4, each power transfer area provided by a charging cell in the first layer of charging cells 402 is marked "L1", each power transfer area provided by a charging cell in the second layer of charging cells 404 is marked "L2", each power transfer area provided by a charging cell in the third layer of charging cells 406 is marked "L3", and each power transfer area provided by a charging cell in the fourth layer of charging cells 408 is marked "L4".

Wireless Transmitter

Figure 5:
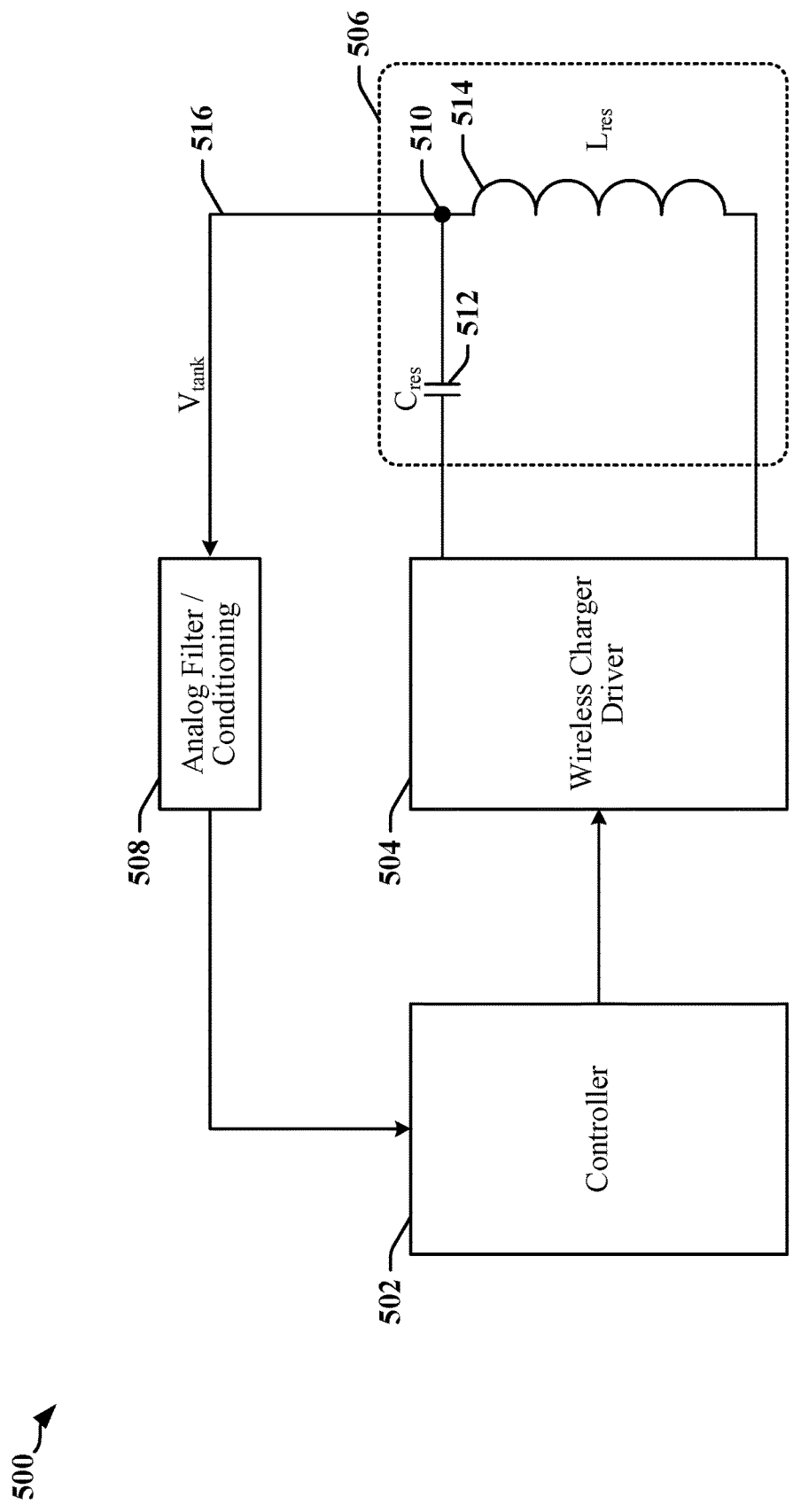
FIG. 5 illustrates a wireless transmitter that may be provided in a charger base station in accordance with certain aspects disclosed herein.

FIG. 5 illustrates an example of a wireless transmitter 500 that can be provided in a base station of a wireless charging device. A base station in a wireless charging device may include one or more processing circuits used to control operations of the wireless charging device. A controller 502 may receive a feedback signal filtered or otherwise processed by a filter circuit 508. The controller may control the operation of a driver circuit 504 that provides an alternating current to a resonant circuit 506. In some examples, the controller 502 may generate a digital frequency reference signal used to control the frequency of the alternating current output by the driver circuit 504. In some instances, the digital frequency reference signal may be generated using a programmable counter or the like. In some examples, the driver circuit 504 includes a power inverter circuit and one or more power amplifiers that cooperate to generate the alternating current from a direct current source or input. In some examples, the digital frequency reference signal may be generated by the driver circuit 504 or by another circuit. The resonant circuit 506 includes a capacitor 512 and inductor 514. The inductor 514 may represent or include one or more transmitting coils in a charging cell that produced a magnetic flux responsive to the alternating current. The resonant circuit 506 may also be referred to herein as a tank circuit, LC tank circuit, or LC tank, and the voltage 516 measured at an LC node 510 of the resonant circuit 506 may be referred to as the tank voltage.

Passive ping techniques may use the voltage and/or current measured or observed at the LC node 510 to identify the presence of a receiving coil in proximity to the charging pad of a device adapted in accordance with certain aspects disclosed herein. Some conventional wireless charging devices include circuits that measure voltage at the LC node 510 of the resonant circuit 506 or the current in the resonant circuit 506. These voltages and currents may be monitored for power regulation purposes and/or to support communication between devices. According to certain aspects of this disclosure, voltage at the LC node 510 in the wireless transmitter 500 illustrated in FIG. 5 may be monitored to support passive ping techniques that can detect presence of a chargeable device or other object based on response of the resonant circuit 506 to a short burst of energy (the ping) transmitted through the resonant circuit 506.

A passive ping discovery technique may be used to provide fast, low-power discovery. A passive ping may be produced by driving a network that includes the resonant circuit 506 with a fast pulse that includes a small amount of energy. The fast pulse excites the resonant circuit 506 and causes the network to oscillate at its natural resonant frequency until the injected energy decays and is dissipated. The response of a resonant circuit 506 to a fast pulse may be determined in part by the resonant frequency of the resonant LC circuit. A response of the resonant circuit 506 to a passive ping that has initial voltage=$V_0$ may be represented by the voltage $V_{LC}$ observed at the LC node 510, such that:

$$V_{LC} = V_0 e^{-\left(\frac{\omega}{2Q}\right)t} \tag{Eq. 1}$$

The resonant circuit 506 may be monitored when the controller 502 or another processor is using digital pings to detect presence of objects. A digital ping is produced by driving the resonant circuit 506 for a period of time. The resonant circuit 506 is a tuned network that includes a transmitting coil of the wireless charging device. A receiving device may modulate the voltage or current observed in the resonant circuit 506 by modifying the impedance presented by its power receiving circuit in accordance with signaling state of a modulating signal. The controller 502 or other processor then waits for a data modulated response that indicates that a receiving device is nearby.

Selectively Activating Coils

According to certain aspects disclosed herein, coils in one or more charging cells may be selectively activated to provide an optimal electromagnetic field for charging a compatible device. In some instances, coils may be assigned to charging cells, and some charging cells may overlap other charging cells. The optimal charging configuration may be selected at the charging cell level. In some examples, a charging configuration may include charging cells at or in a charging surface that are determined to be aligned with or located close to the device to be charged. A controller may activate a single coil or a combination of coils based on the charging configuration which in turn is based on detection of location of the device to be charged. In some implementations, a wireless charging device may have a driver circuit that can selectively activate one or more transmitting coils or one or more predefined charging cells during a charging event.

Figure 6:
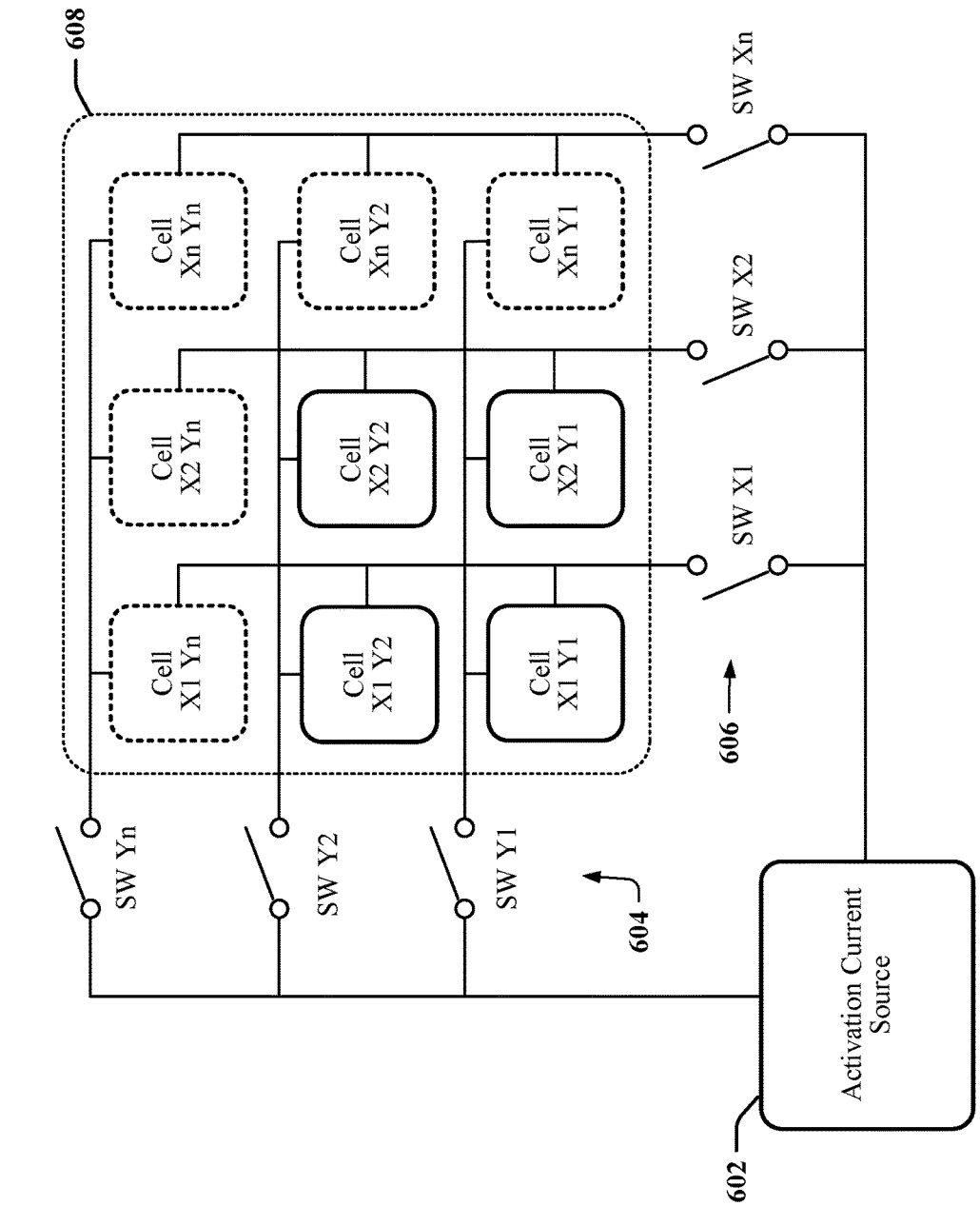
FIG. 6 illustrates a first topology that supports matrix multiplexed switching for use in a wireless charging device adapted in accordance with certain aspects disclosed herein.

FIG. 6 illustrates a first topology 600 that supports matrix multiplexed switching for use in a wireless charging device adapted in accordance with certain aspects disclosed herein. The wireless charging device may select one or more charging cells 100 to charge a receiving device. Charging cells 100 that are not in use can be disconnected from current flow. A relatively large number of charging cells 100 may be used in the honeycomb packaging configuration illustrated in FIGS. 2 and 3, requiring a corresponding number of switches. According to certain aspects disclosed herein, the charging cells 100 may be logically arranged in a matrix 608 having multiple cells connected to two or more switches that enable specific cells to be powered. In the illustrated topology 600, a two-dimensional matrix 608 is provided, where the dimensions may be represented by X and Y coordinates. Each of a first set of switches 606 is configured to selectively couple a first terminal of each cell in a column of cells to a first terminal of a voltage or current source 602 that provides current to activate coils in one or more charging cells during wireless charging. Each of a second set of switches 604 is configured to selectively couple a second terminal of each cell in a row of cells to a second terminal of the voltage or current source 602. A charging cell is active when both terminals of the cell are coupled to the voltage or current source 602.

The use of a matrix 608 can significantly reduce the number of switching components needed to operate a network of tuned LC circuits. For example, N individually connected cells require at least N switches, whereas a two-dimensional matrix 608 having N cells can be operated with √N switches. The use of a matrix 608 can produce significant cost savings and reduce circuit and/or layout complexity. In one example, a 9-cell implementation can be implemented in a 3×3 matrix 608 using 6 switches, saving 3 switches. In another example, a 16-cell implementation can be implemented in a 4×4 matrix 608 using 8 switches, saving 8 switches.

During operation, at least 2 switches are closed to actively couple one coil or charging cell to the voltage or current source 602. Multiple switches can be closed at once in order to facilitate connection of multiple coils or charging cells to the voltage or current source 602. Multiple switches may be closed, for example, to enable modes of operation that drive multiple transmitting coils when transferring power to a receiving device.

Figure 7:
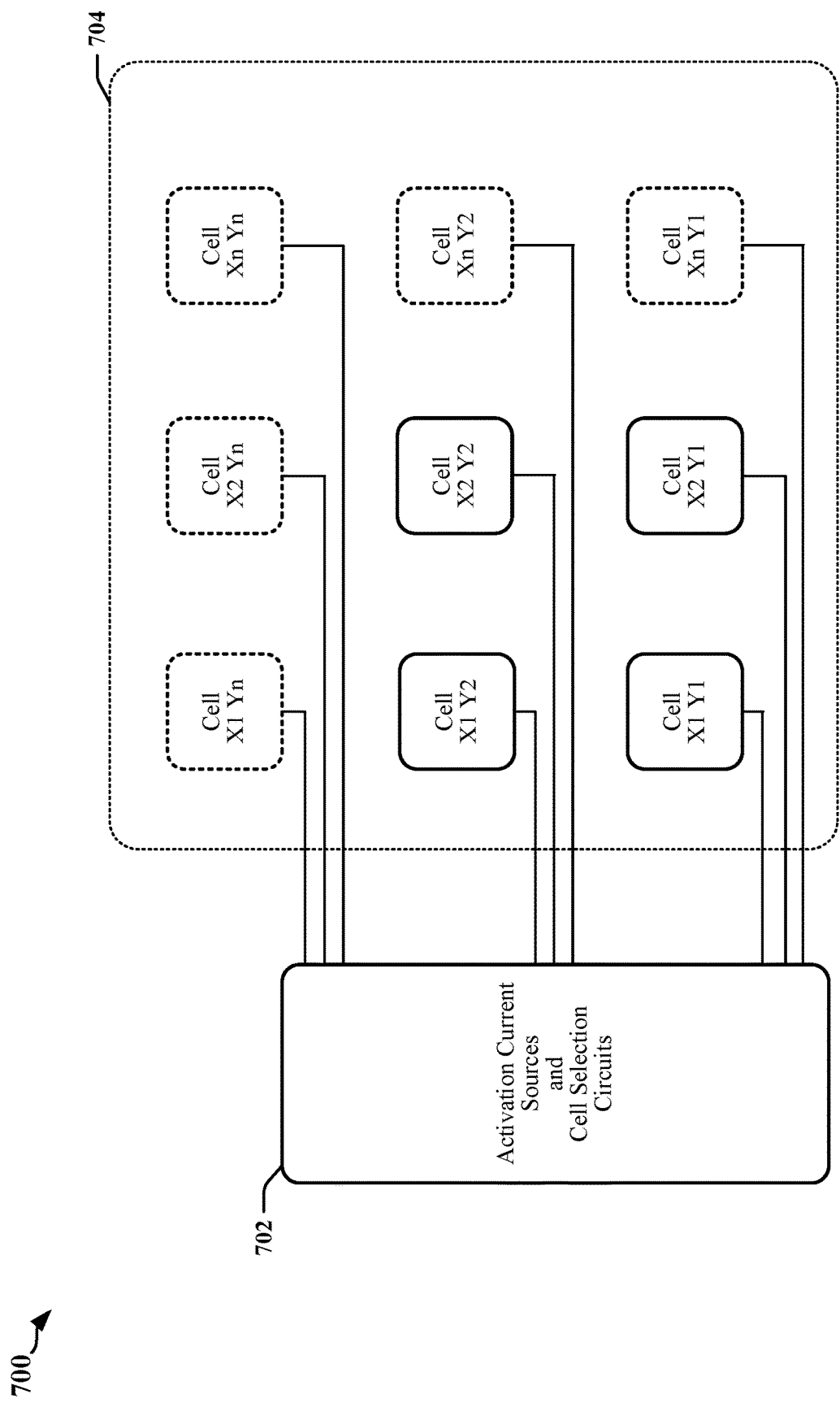
FIG. 7 illustrates a second topology that supports direct current drive in a wireless charging device adapted in accordance with certain aspects disclosed herein.

FIG. 7 illustrates a second topology 700 in which each individual coil or charging cell is individually and/or directly driven by a driver circuit 702 in accordance with certain aspects disclosed herein. The driver circuit 702 may be configured to select one or more coils or charging cells 100 from a group of coils 704 to charge a receiving device. It will be appreciated that the concepts disclosed here in relation to charging cells 100 may be applied to selective activation of individual coils or stacks of coils. Charging cells 100 that are not in use receive no current flow. A relatively large number of charging cells 100 may be in use and a switching matrix may be employed to drive individual coils or groups of coils. In one example, a first switching matrix may configure connections that define a charging cell or group of coils to be used during a charging event and a second switching matrix may be used to activate the charging cell and/or group of selected coils.

Flux Manipulation in a Multi-Coil Wireless Charger

Figure 8:
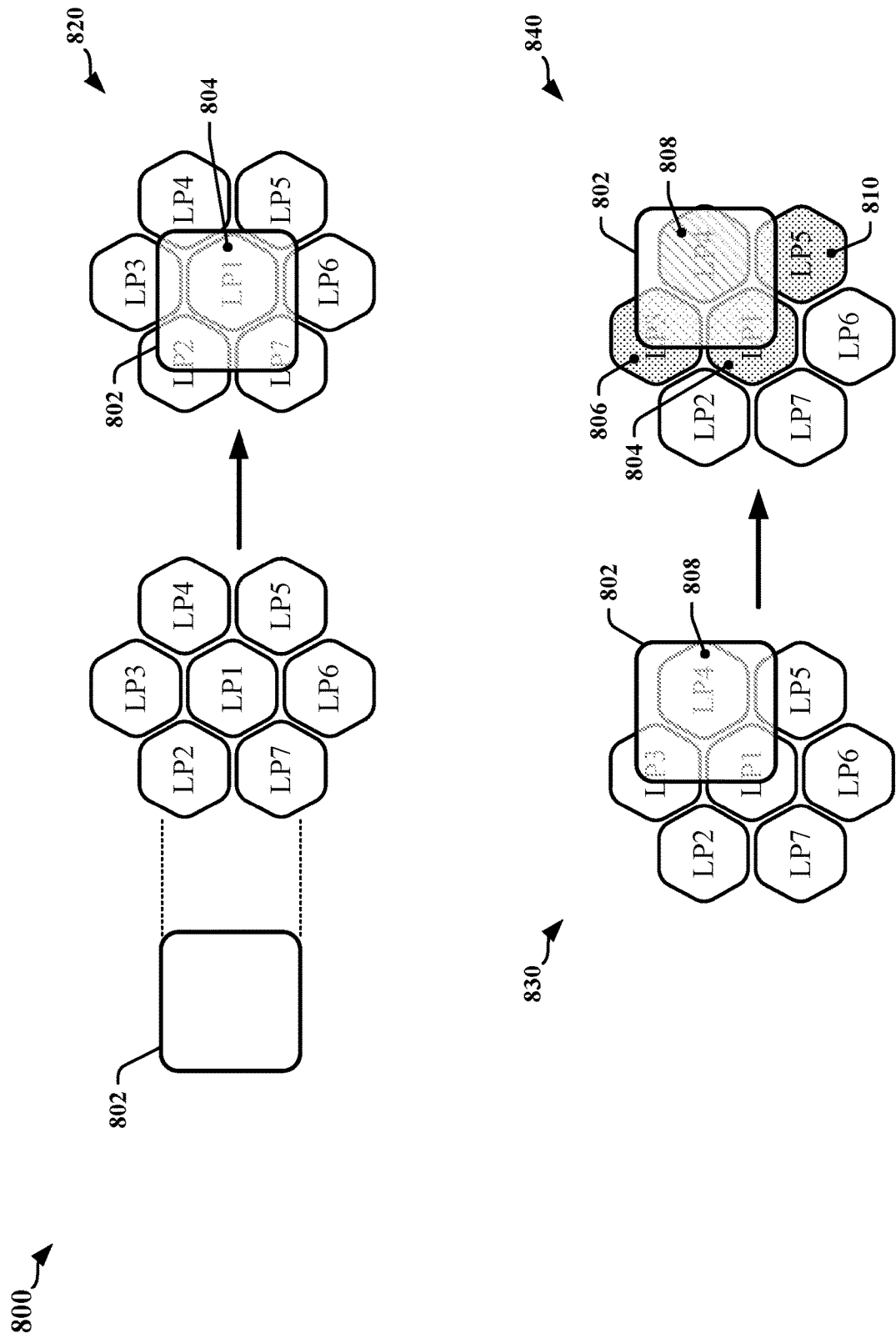
FIG. 8 illustrates first configurations of a charging surface and a chargeable device in accordance with certain aspects disclosed herein.

FIG. 8 illustrates certain examples 800, 820, 830, 840 of positioning of a chargeable device 802 on a group of charging cells in a charging surface of a wireless charging device. Each charging cell includes at least one charging coil. The chargeable device 802 can be freely positioned on the charging surface. The chargeable device 802 has an area that is comparable to the area occupied by the power transfer area of each charging cell of a charging surface, or to the area occupied by the power transfer area of a constituent inductive charging coil in a charging cell. In the illustrated examples 800, 820, 830, 840, the chargeable device 802 is somewhat larger than a single charging coil 804. Based on the geometry and arrangement of the charging coils 804, 806, 808, 810 the chargeable device 802 can physically cover adjacent charging coils. In the third and fourth examples 830, 840, the chargeable device 802 has been placed such that it substantially overlaps a single charging coil 808 and partially covers multiple other charging coils 804, 806, 810. The chargeable device 802 may receive power from one or more charging coils 804, 806, 808, 810 after it has established its presence.

Figure 9:
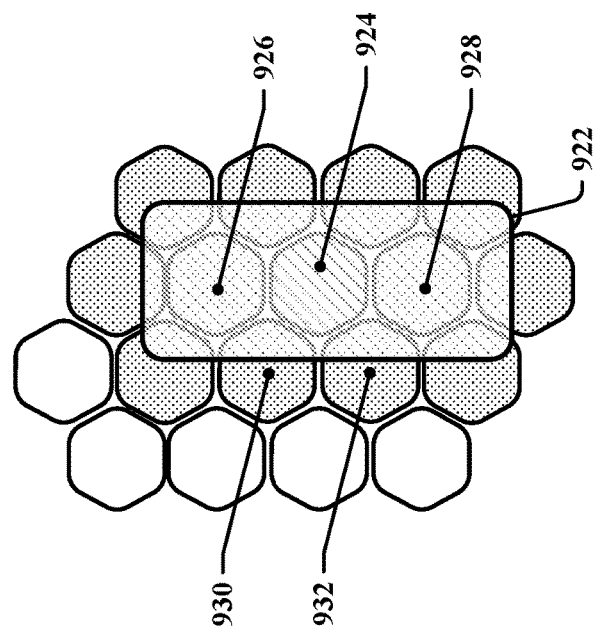
FIG. 9 illustrates second charging configurations on a charging surface when a chargeable device is being charged in accordance with certain aspects disclosed herein.
Figure 9:
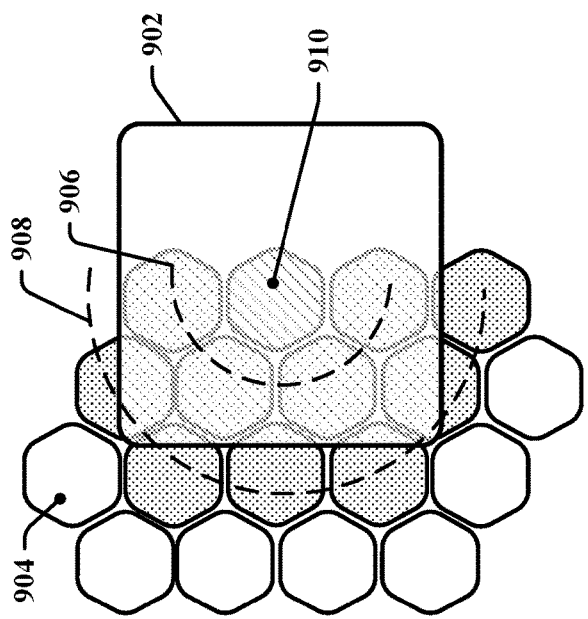

Certain aspects of this disclosure can accommodate charging configurations using multiple adjacent charging cells or charging coils 804, 806, 808, 810. In accordance with certain aspects of this disclosure, any number of charging coils may be available for charging a chargeable device. FIG. 9 illustrates certain aspects of charging configurations 900, 920 that may be defined for a wireless charging device when a chargeable device 902, 922 is presented for charging or is being charged on or at a charging surface of the wireless charging device. The number and location of usable charging cells or charging coils may vary based on the type of an optimally-positioned charging coil 910, 926, the charging contract negotiated between the charging surface and the chargeable device 902, 922, and the topology or configuration of the charging surface. For example, the number and location of usable charging cells or charging coils may be based on the maximum or contracted charging power transmitted through the active coil 910 or potentially through another charging coil 904, or on other factors.

In the first configuration 900, the chargeable device 902 may identify charging cells that are candidates for inclusion in a charging configuration. Each charging cell includes at least one charging coil. In the illustrated example, the chargeable device 902 has been placed such that its center is substantially coaxial with a first charging coil 910. For the purposes of this description, it will be assumed that the center of a first receiving coil 910 within the chargeable device 902 is located at the center of the chargeable device 902. In this example, the wireless charging device may determine that the first charging coil 910 has the strongest coupling with the receiving coil in the chargeable device 902 with respect to the coils in the next bands 906, 908 of charging coils 906. In one example, the wireless charging device may define the charging configuration as including at least the first charging coil 910. In some examples, the charging configuration may identify one or more charging coils in the first band 906 to be activated during charging procedures.

In the second charging configuration 920, the wireless charging device may employ sensing techniques that can detect the edges of the chargeable device 922. For example, the outline of the chargeable device 922 can be detected using capacitive sense, inductive sense, pressure, Q-factor measurement or any other suitable device locating technology. In some instances, the outline of the chargeable device 922 can be determined using one or more sensors provided in or on the charging surface. In the illustrated example, the chargeable device 922 has an elongated shape. For the purposes of this description, it will be assumed that the center of a first receiving coil 924 within the chargeable device 922 is located at the center of the chargeable device 922. The wireless charging device may determine that the first charging coil 924 has the strongest coupling with the receiving coil in the chargeable device 922. In one example, the wireless charging device may define the charging configuration as including at least the first charging coil 924. Charging coils 926, 928 that are adjacent to the first receiving coil 924 and that lie under and within the outline of the chargeable device 922 may be included in some charging configurations. Other coils 930, 932 that are adjacent to the first receiving coil 924 and that lie partially under and within the outline of the chargeable device 922 may be defined by some charging configurations to be activated during certain charging procedures.

In some examples, a chargeable device may receive power from two or more active charging cells and/or charging coils. In one example, the chargeable device may have a relatively large footprint with respect to the charging surface and may have multiple receiving coils that can engage multiple charging coils to receive power. In another example, a receiving coil of the chargeable device may be placed substantially equidistant from two or more charging coils and a charging configuration may be defined whereby two or more adjacent charging coils in the charging surface provide power to the chargeable device.

Figure 10:
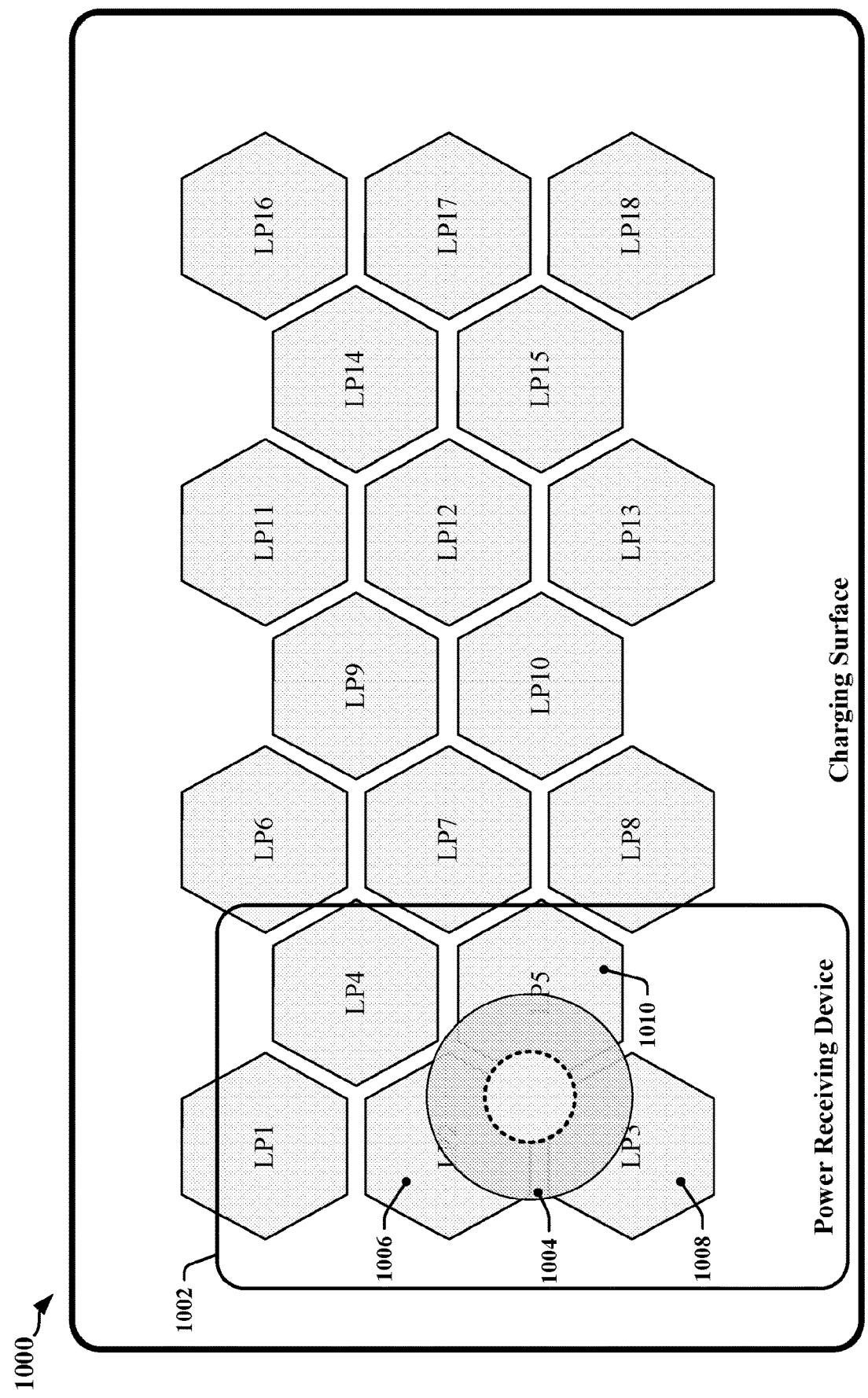
FIG. 10 illustrates a charging surface of a multi-device wireless charger provided in accordance with certain aspects disclosed herein.

FIG. 10 illustrates a charging surface 1000 of a wireless charging device upon which a receiving device 1002 has been placed. The receiving device 1002 has a single receiving coil 1004 that can be electromagnetically coupled with one or more charging cells or transmitting coils (marked LP-1 through LP-18) in the charging surface 1000. In the illustrated example, the receiving coil 1004 is adjacent and partially covering three charging cells or transmitting coils 1006, 1008, 1010. One or more drivers may be operated to provide a charging current to the three charging cells or transmitting coils 1006, 1008, 1010. In one example, the driver circuit may configure a charging current for each of the three charging cells or transmitting coils 1006, 1008, 1010. In another example, the driver circuit may configure a charging current provided to two or more of the three charging cells or transmitting coils 1006, 1008, 1010.

According to certain aspects of this disclosure, a multi-coil wireless charging system may be adapted or configured to select a configuration of charging coils that yields a maximized efficiency for power transfer to the receiving device. In one example, the charging system may use reported power to check a selected configuration. The receiving device 1002 may be configured to measure received power and to transmit a report of the measured power in a message transmitted to the wireless charging device. In one example, the message may be transmitted by an amplitude shift key modulating the tank voltage or current in the transmitting device. In one example, the efficiency of the selected configuration may be determined based on the total lost power in the system (delta-Power) that can be measured as:

$$\Delta P = P_{Tx}(\text{Power Input}) - P_{Tx}(\text{Reported Power})$$

Reported power is provided in many wireless charging systems as a way to detect foreign objects as part of a foreign object detection (FOD) function. The difference between reported power and transmitted power may relate to changes in the output load of the receiver. Efficiency of the selected configuration may be used as feedback in a configuration selection procedure. In some implementations, the voltage measured at a node in the tank circuit, which may be referred to as the tank voltage (Vpk), may be used as a metric when selecting an optimal configuration of charging coils. For example, decreasing tank voltage is indicative of improving coupling because less reactive energy is present in the tank circuit.

Figure 11:
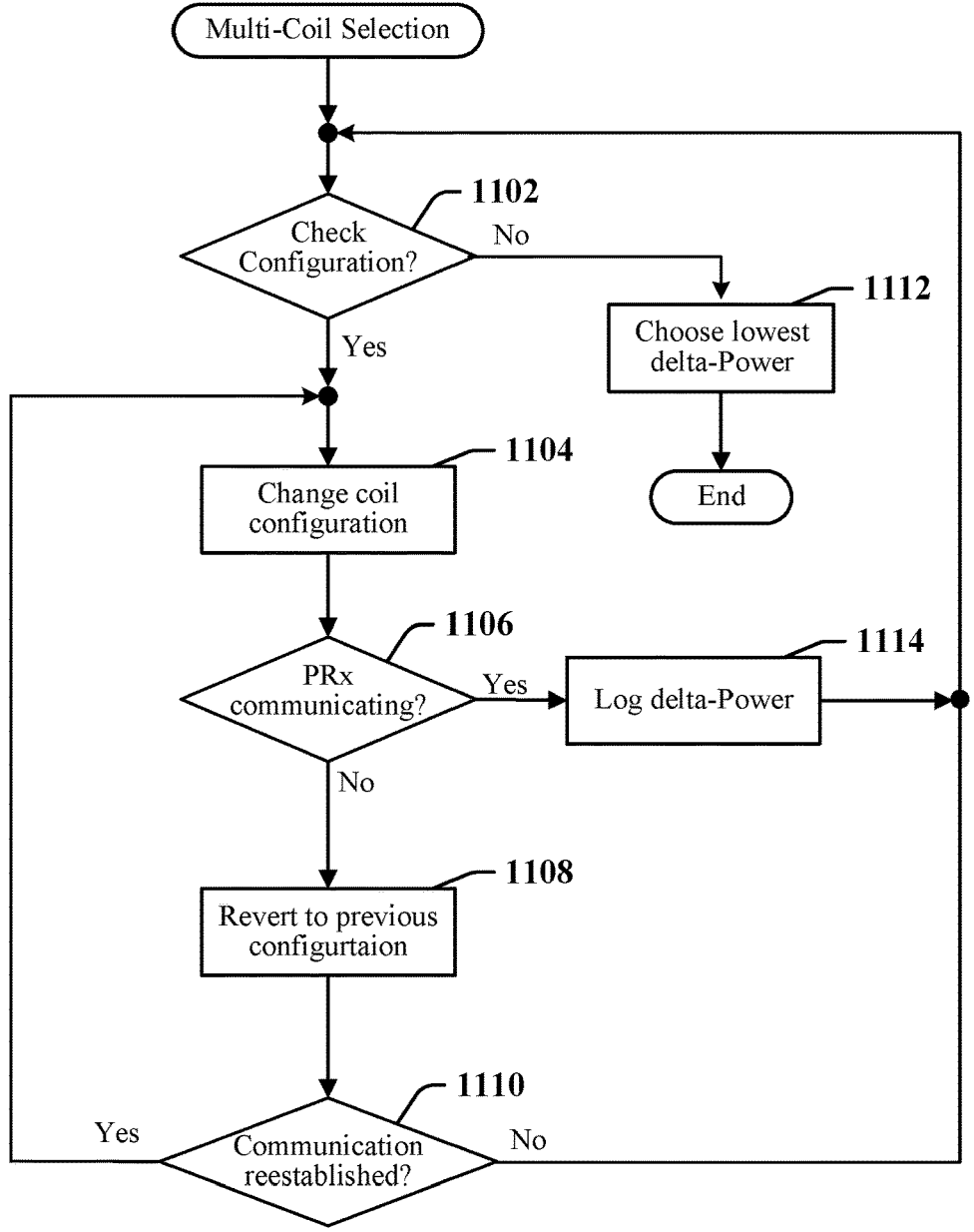
FIG. 11 is first flowchart illustrating an example of a multi-coil selection method provided in accordance with certain aspects disclosed herein.

FIG. 11 is flowchart 1100 illustrating one example of a method for selecting a configuration of charging coils in a wireless charging device. The method may be performed by a controller provided in a wireless charging apparatus. At block 1102, the controller may determine if a configuration of charging coils is available for use. Multiple configurations of charging coils may become available when a receiving coil 1004 in a receiving device 1002 is adjacent or coupled to multiple charging coils 1006, 1008, 1010. Table 1 illustrates an example of possible configurations, with some good and some bad configurations identified.

TABLE 1

| Iteration | Coils in Configuration | Outcome |
|---|---|---|
| 1 | LP2 | Bad |
| 2 | LP3 | Bad |
| 3 | LP5 | Bad |
| 4 | LP2, LP3 | Better |
| 5 | LP2, LP5 | Better |
| 6 | LP3, LP5 | Better |
| 7 | LP2, LP3, LP5 | Best |

Configurations of charging coils may be reassessed after a change in the operation of the charging system has occurred, including detection of a repositioning of the receiving device 1002, for example.

If at block 1102, the controller determines that no new configurations are to be tested, then at block 1112 the controller may choose the configuration with the lowest calculated delta-Power. If at block 1102, the controller determines that one or more configurations remain to be tested, then at block 1104 the controller may reconfigure the charging configuration using a different combination of charging coils.

At block 1106, the controller may determine if the receiving device 1002 is communicating with the transmitting device through the charging surface 1000. If at block 1106, the controller determines that the receiving device 1002 is communicating, then at block 1114 the controller may calculate and/or log the delta-Power associated with the current charging configuration and resume configuration checking at block 1102. If at block 1106, the controller determines that the receiving device 1002 is not communicating, then at block 1108 the controller may restore the prior charging configuration.

After restoring the prior charging configuration, the controller may determine at block 1110 whether communication with the receiving device 1002 has been restored or reestablished. If at block 1110, the controller determines that the receiving device 1002 is communicating, then the controller may optionally retry the configuration that resulted in failed communication at block 1104. If at block 1110, the controller determines that the receiving device 1002 is not communicating, then the controller may resume configuration checking at block 1102.

Figure 12:
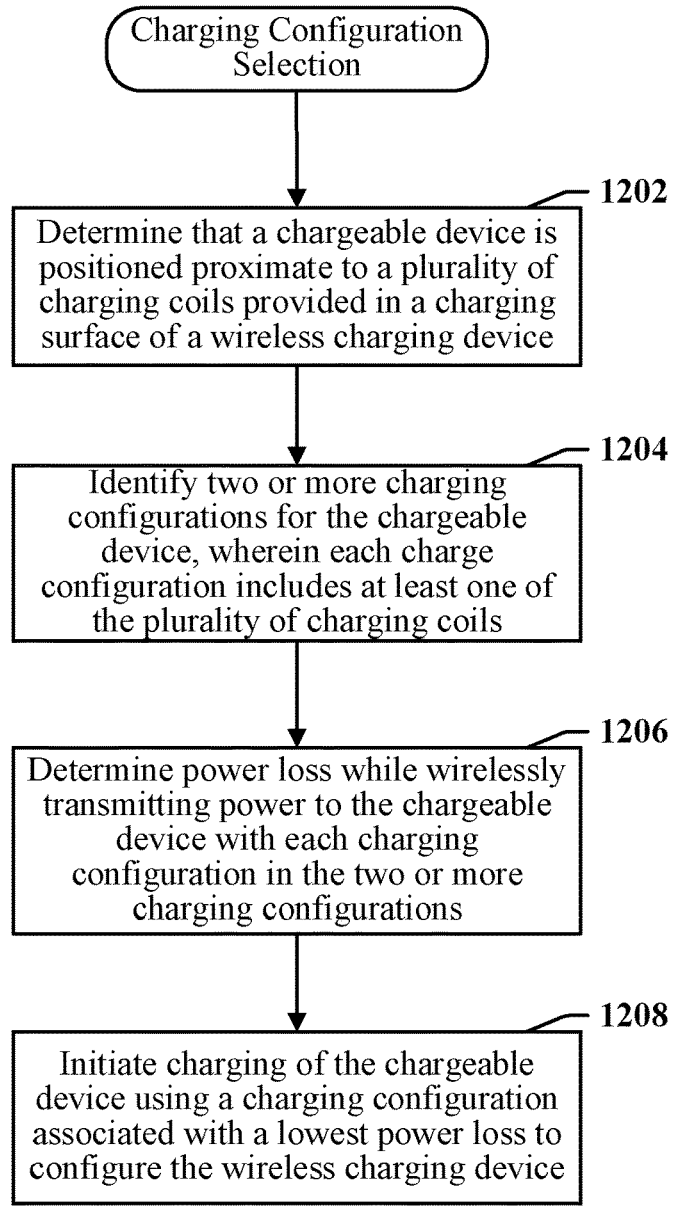
FIG. 12 is second flowchart illustrating an example of a multi-coil selection method provided in accordance with certain aspects disclosed herein.

FIG. 12 is flowchart 1200 illustrating one example of a method for operating a wireless charging device that includes or implements a charging surface. The method may be performed by a controller provided in the wireless charging apparatus. At block 1202, the controller may determine that a chargeable device is positioned proximate to a plurality of charging coils provided in the charging surface. At block 1204, the controller may identify two or more charging configurations for the chargeable device where each charge configuration includes at least one of the plurality of charging coils. At block 1206, the controller may determine power loss while wirelessly transmitting power to the chargeable device for each charging configuration in the two or more charging configurations. At block 1208, the controller may initiate charging of the chargeable device using a charging configuration associated with a lowest power loss to configure the charging surface.

In certain implementations, determining power loss includes configuring the plurality of charging coils based on a current charging configuration, and receiving a reported power from the chargeable device while the chargeable device is being charged using the current charging configuration. The controller may calculate power loss as a difference between the reported power and power expended by the wireless charging device while charging the chargeable device.

In one example, the controller may select a charging configuration after detecting that the chargeable device is located on the charging surface. In one example, the controller may select a charging configuration after detecting that the chargeable device has been relocated on the charging surface.

Example of a Processing Circuit

Figure 13:
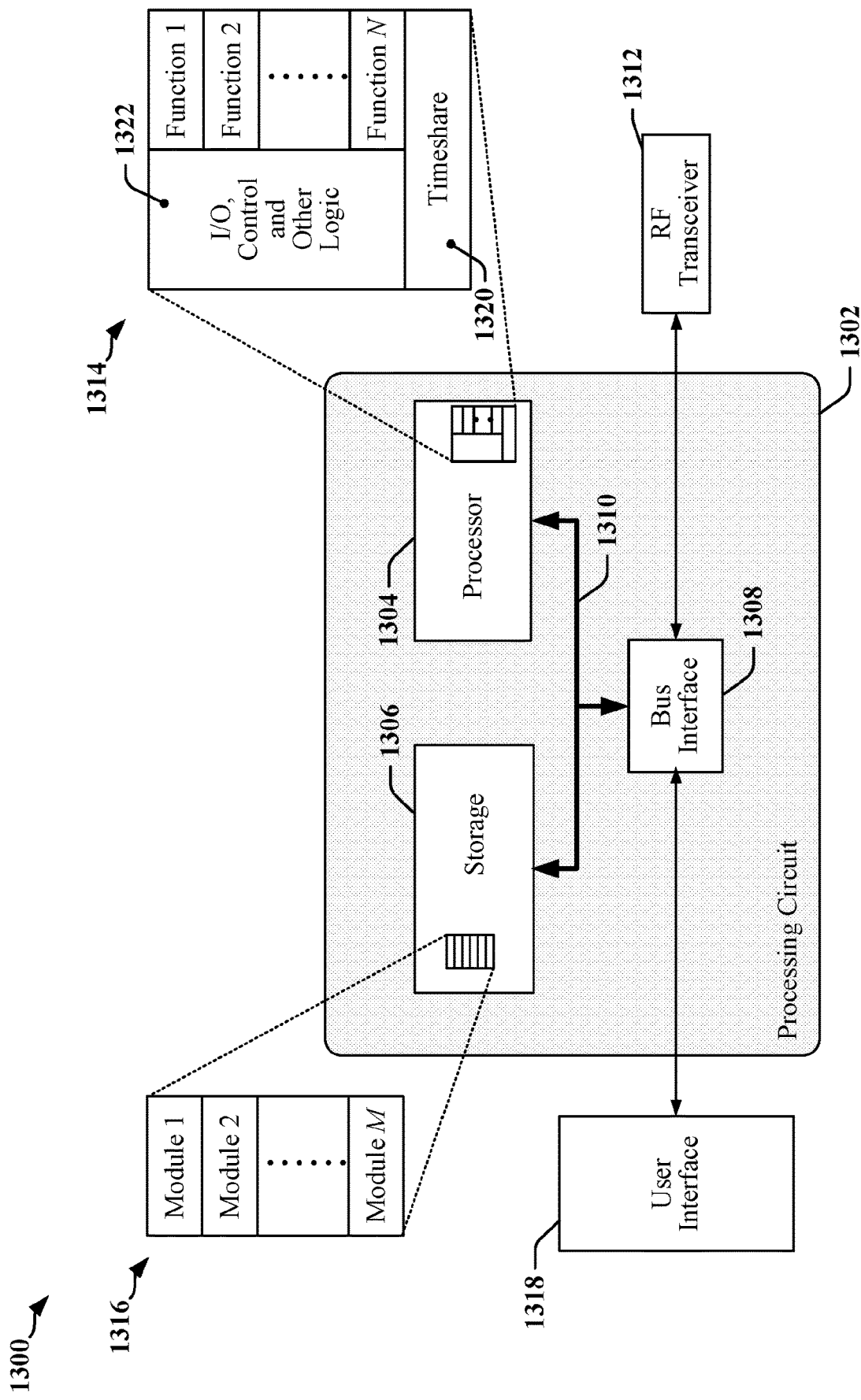
FIG. 13 illustrates one example of an apparatus employing a processing circuit that may be adapted according to certain aspects disclosed herein.

FIG. 13 illustrates an example of a hardware implementation for an apparatus 1300 that may be incorporated in a wireless charging device or in a receiving device that enables a battery to be wirelessly charged. In some examples, the apparatus 1300 may perform one or more functions disclosed herein. In accordance with various aspects of the disclosure, an element, or any portion of an element, or any combination of elements as disclosed herein may be implemented using a processing circuit 1302. The processing circuit 1302 may include one or more processors 1304 that are controlled by some combination of hardware and software modules. Examples of processors 1304 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1304 may include specialized processors that perform specific functions, and that may be configured, augmented or controlled by one of the software modules 1316. The one or more processors 1304 may be configured through a combination of software modules 1316 loaded during initialization, and further configured by loading or unloading one or more software modules 1316 during operation.

In the illustrated example, the processing circuit 1302 may be implemented with a bus architecture, represented generally by the bus 1310. The bus 1310 may include any number of interconnecting buses and bridges depending on the specific application of the processing circuit 1302 and the overall design constraints. The bus 1310 links together various circuits including the one or more processors 1304, and storage 1306. Storage 1306 may include memory devices and mass storage devices, and may be referred to herein as computer-readable media and/or processor-readable media. The storage 1306 may include transitory storage media and/or non-transitory storage media.

The bus 1310 may also link various other circuits such as timing sources, timers, peripherals, voltage regulators, and power management circuits. A bus interface 1308 may provide an interface between the bus 1310 and one or more transceivers 1312. In one example, a transceiver 1312 may be provided to enable the apparatus 1300 to communicate with a charging or receiving device in accordance with a standards-defined protocol. Depending upon the nature of the apparatus 1300, a user interface 1318 (e.g., keypad, display, speaker, microphone, joystick) may also be provided, and may be communicatively coupled to the bus 1310 directly or through the bus interface 1308.

A processor 1304 may be responsible for managing the bus 1310 and for general processing that may include the execution of software stored in a computer-readable medium that may include the storage 1306. In this respect, the processing circuit 1302, including the processor 1304, may be used to implement any of the methods, functions and techniques disclosed herein. The storage 1306 may be used for storing data that is manipulated by the processor 1304 when executing software, and the software may be configured to implement any one of the methods disclosed herein.

One or more processors 1304 in the processing circuit 1302 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1306 or in an external computer-readable medium. The external computer-readable medium and/or storage 1306 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1306 may also include, by way of example, a carrier wave, a transmission line, and any other suitable medium for transmitting software and/or instructions that may be accessed and read by a computer. Computer-readable medium and/or the storage 1306 may reside in the processing circuit 1302, in the processor 1304, external to the processing circuit 1302, or be distributed across multiple entities including the processing circuit 1302. The computer-readable medium and/or storage 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1306 may maintain and/or organize software in loadable code segments, modules, applications, programs, etc., some or all of which may be referred to herein as software modules 1316. Each of the software modules 1316 may include instructions and data that, when installed or loaded on the processing circuit 1302 and executed by the one or more processors 1304, contribute to a run-time image 1314 that controls the operation of the one or more processors 1304. When executed, certain instructions may cause the processing circuit 1302 to perform functions in accordance with certain methods, algorithms and processes described herein.

Some of the software modules 1316 may be loaded during initialization of the processing circuit 1302, and these software modules 1316 may configure the processing circuit 1302 to enable performance of the various functions disclosed herein. For example, some software modules 1316 may configure internal devices and/or logic circuits 1322 of the processor 1304, and may manage access to external devices such as a transceiver 1312, the bus interface 1308, the user interface 1318, timers, mathematical coprocessors, and so on. The software modules 1316 may include a control program and/or an operating system that interacts with interrupt handlers and device drivers, and that controls access to various resources provided by the processing circuit 1302. The resources may include memory, processing time, access to a transceiver 1312, the user interface 1318, and so on.

One or more processors 1304 of the processing circuit 1302 may be multifunctional, whereby some of the software modules 1316 are loaded and configured to perform different functions or different instances of the same function. The one or more processors 1304 may additionally be adapted to manage background tasks initiated in response to inputs from the user interface 1318, the transceiver 1312, and device drivers, for example. To support the performance of multiple functions, the one or more processors 1304 may be configured to provide a multitasking environment, whereby each of a plurality of functions is implemented as a set of tasks serviced by the one or more processors 1304 as needed or desired. In one example, the multitasking environment may be implemented using a timesharing program 1320 that passes control of a processor 1304 between different tasks, whereby each task returns control of the one or more processors 1304 to the timesharing program 1320 upon completion of any outstanding operations and/or in response to an input such as an interrupt. When a task has control of the one or more processors 1304, the processing circuit is effectively specialized for the purposes addressed by the function associated with the controlling task. The timesharing program 1320 may include an operating system, a main loop that transfers control on a round-robin basis, a function that allocates control of the one or more processors 1304 in accordance with a prioritization of the functions, and/or an interrupt driven main loop that responds to external events by providing control of the one or more processors 1304 to a handling function.

In one example, the apparatus 1300 includes or operates as a wireless charging apparatus that has a battery charging power source coupled to a charging circuit, a plurality of charging cells and a controller, which may be included in one or more processors 1304. The plurality of charging cells may be configured to provide a charging surface. At least one coil may be configured to direct an electromagnetic field through a charge transfer area of each charging cell.

The controller may be configured to determine that a chargeable device is positioned proximate to a plurality of charging coils provided in the charging surface, identify two or more charging configurations for the chargeable device where each charge configuration includes at least one of the plurality of charging coils, determine power loss while wirelessly transmitting power to the chargeable device for each charging configuration in the two or more charging configurations, and initiate charging of the chargeable device using a charging configuration associated with a lowest power loss to configure the wireless charging device.

In certain implementations, the controller is configured to configure the plurality of charging coils based on a current charging configuration, and receive a reported power from the chargeable device while the chargeable device is being charged using the current charging configuration. The controller may be configured to calculate power loss as a difference between the reported power and power expended by the wireless charging device while charging the chargeable device. The controller may be configured to select a charging configuration after detecting that the chargeable device is located on the charging surface. The controller may be configured to select a charging configuration after detecting that the chargeable device has been relocated on the charging surface.

In some implementations, the storage 1306 maintains instructions and information where the instructions are configured to cause the one or more processors 1304 to determine that a chargeable device is positioned proximate to a charging coil provided by a charging surface of a wireless charging device, provide a charging current to the charging coil, and exclude a plurality of adjacent coils from operation while the current is provided to the charging coil. Each of the adjacent coils may be located within the charging surface adjacent to the charging coil.

In some implementations, the instructions are configured to cause the one or more processors 1304 to determine that a chargeable device is positioned proximate to a plurality of charging coils provided in or at the charging surface, identify two or more charging configurations for the chargeable device, where each charge configuration includes at least one of the plurality of charging coils, determine power loss while wirelessly transmitting power to the chargeable device for each charging configuration in the two or more charging configurations, and initiate charging of the chargeable device using a charging configuration associated with a lowest power loss to configure the wireless charging device.

In a certain examples, the instructions are configured to cause the one or more processors 1304 to configure the plurality of charging coils based on a current charging configuration, and receive a reported power from the chargeable device while the chargeable device is being charged using the current charging configuration. The instructions may be configured to cause the one or more processors 1304 to calculate power loss as a difference between the reported power and power expended by the wireless charging device while charging the chargeable device. The instructions may be configured to cause the one or more processors 1304 to select a charging configuration after detecting that the chargeable device is located on the charging surface. The instructions may be configured to cause the one or more processors 1304 to select a charging configuration after detecting that the chargeable device has been relocated on the charging surface.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for operating a wireless charging device, comprising:
    determining that a chargeable device is positioned proximate to a plurality of charging coils provided at a charging surface of the wireless charging device;
    identifying two charging configurations for the chargeable device, wherein each charging configuration includes at least one charging coil that is determined to be aligned with or located close to the chargeable device;
    determining power loss while wirelessly transmitting power to the chargeable device in accordance with a first charging configuration;
    determining power loss while wirelessly transmitting power to the chargeable device in accordance with a second charging configuration;
    charging the chargeable device through a first charging coil when power loss associated with the first charging configuration is lower than power loss associated with the second charging configuration, wherein the first charging coil is included in the first charging configuration; and
    charging the chargeable device through a second charging coil when power loss associated with the second charging configuration is lower than power loss associated with the first charging configuration, wherein the second charging coil is included in the second charging configuration.

2. The method of claim 1, wherein determining power loss comprises:
    configuring the plurality of charging coils based on a current charging configuration; and
    receiving a reported power from the chargeable device while the chargeable device is being charged using the current charging configuration.

3. The method of claim 2, further comprising:
    calculating power loss as a difference between the reported power and power expended by the charging device while charging the chargeable device.

4. The method of claim 1, further comprising:
    selecting a charging configuration after detecting that the chargeable device is located on the charging surface.

5. The method of claim 1, further comprising:
    selecting a charging configuration after detecting that the chargeable device has been relocated on the charging surface.

6. A wireless charging device, comprising:
    a plurality of charging cells; and
    a controller configured to:
        determine that a chargeable device is positioned proximate to a plurality of charging coils provided at a charging surface;
        identify two charging configurations for the chargeable device, wherein each charging configuration includes at least one charging coil that is determined to be aligned with or located close to the chargeable device;
        determine power loss while wirelessly transmitting power to the chargeable device in accordance with a first charging configuration;
        determine power loss while wirelessly transmitting power to the chargeable device in accordance with a second charging configuration;
        charge the chargeable device through a first charging coil when power loss associated with the first charging configuration is lower than power loss associated with the second charging configuration, wherein the first charging coil is included in the first charging configuration; and
        charge the chargeable device through a second charging coil when power loss associated with the second charging configuration is lower than power loss associated with the first charging configuration, wherein the second charging coil is included in the second charging configuration.

7. The wireless charging device of claim 6, wherein the controller is configured to:
    configure the plurality of charging coils based on a current charging configuration; and
    receive a reported power from the chargeable device while the chargeable device is being charged using the current charging configuration.

8. The wireless charging device of claim 7, wherein the controller is configured to:
    calculate power loss as a difference between the reported power and power expended by the charging device while charging the chargeable device.

9. The wireless charging device of claim 6, wherein the controller is configured to:
    select a charging configuration after detecting that the chargeable device is located on the charging surface.

10. The wireless charging device of claim 6, wherein the controller is configured to:
    select a charging configuration after detecting that the chargeable device has been relocated on the charging surface.

11. A non-transitory processor readable storage medium, comprising code for:
    determining that a chargeable device is positioned proximate to a plurality of charging coils provided at a charging surface of a wireless charging device;

identifying two charging configurations for the chargeable device, wherein each charging configuration includes at least one charging coil that is determined to be aligned with or located close to the chargeable device;

determining power loss while wirelessly transmitting power to the chargeable device in accordance with a first charging configuration;

determining power loss while wirelessly transmitting power to the chargeable device in accordance with a second charging configuration; and charging the chargeable device through a first charging coil when power loss associated with the first charging configuration is lower than power loss associated with the second charging configuration, wherein the first charging coil is included in the first charging configuration; and charging the chargeable device through a second charging coil when power loss associated with the second charging configuration is lower than power loss associated with the first charging configuration, wherein the second charging coil is included in the second charging configuration.

12. The storage medium of claim 11, wherein determining power loss comprises:

configuring the plurality of charging coils based on a current charging configuration; and receiving a reported power from the chargeable device while the chargeable device is being charged using the current charging configuration.

13. The storage medium of claim 12, further comprising:
calculating power loss as a difference between the reported power and power expended by the charging device while charging the chargeable device.

14. The storage medium of claim 11, further comprising:
selecting a charging configuration after detecting that the chargeable device is located on the charging surface.

15. The storage medium of claim 11, further comprising:
selecting a charging configuration after detecting that the chargeable device has been relocated on the charging surface.

16. The method of claim 1, wherein the first charging coil and the second charging coil are assigned to different charging cells.

17. The method of claim 1, further comprising:
charging the chargeable device through a third charging coil while charging the chargeable device through the first charging coil when the first charging coil and the third charging coil are included in the first charging configuration.

18. The method of claim 17, further comprising:
charging the chargeable device through a fourth charging coil while charging the chargeable device through the second charging coil when the second charging coil and the fourth charging coil are included in the first charging configuration.

* * * * *